US010851825B2

(12) United States Patent
Regnard et al.

(10) Patent No.: US 10,851,825 B2
(45) Date of Patent: *Dec. 1, 2020

(54) METAL ATTACHMENT

(71) Applicant: LISI AEROSPACE, Paris (FR)

(72) Inventors: Benoit Regnard, Saint Germain de la Grange (FR); Julien Goyer, Saint Gratien (FR); Martial Broucke, Trie Chateau (FR)

(73) Assignee: LISI AEROSPACE, Paris (FR)

( * ) Notice: Subject to any disclaimer, the term of this patent is extended or adjusted under 35 U.S.C. 154(b) by 825 days.

This patent is subject to a terminal disclaimer.

(21) Appl. No.: 14/906,258

(22) PCT Filed: Jul. 21, 2014

(86) PCT No.: PCT/EP2014/065647
§ 371 (c)(1),
(2) Date: Jan. 19, 2016

(87) PCT Pub. No.: WO2015/007919
PCT Pub. Date: Jan. 22, 2015

(65) Prior Publication Data
US 2016/0169262 A1 Jun. 16, 2016

(30) Foreign Application Priority Data
Jul. 19, 2013 (FR) ...................... 13 57157

(51) Int. Cl.
*F16B 35/04* (2006.01)
*F16B 33/06* (2006.01)
(Continued)

(52) U.S. Cl.
CPC ............. *F16B 33/06* (2013.01); *B64D 45/02* (2013.01); *C25D 11/022* (2013.01); *F16B 25/0021* (2013.01); *F16B 33/006* (2013.01)

(58) Field of Classification Search
USPC ........................................................ 411/424
See application file for complete search history.

(56) References Cited

U.S. PATENT DOCUMENTS 2,518,468 A * 8/1950 Harding .................. F16B 33/06
411/269
2,934,480 A 4/1960 Slomin
(Continued)

FOREIGN PATENT DOCUMENTS

DE 19840298 A1 3/2000
DE 202006008314 U1 8/2007
(Continued)

OTHER PUBLICATIONS

Poll, Andreas, International Search Report for WO/2015/007957, dated Mar. 13, 2014, 6 pages, ISA European Patent Office.
(Continued)

*Primary Examiner* — Gary W Estremsky
(74) *Attorney, Agent, or Firm* — Henricks Slavin LLP

(57) ABSTRACT

The invention concerns a metal attachment for providing an electrically conductive surface through the entire thickness of structural elements to be assembled. The attachment thereby comprises a head (12) and a smooth shank (14) extending along an axis of revolution, characterized in that the shank comprising at least one conductive portion (24) and one lubricating portion (22) disposed along the axis of revolution of the attachment along at least one length of the shank. The attachment according to the invention provides a conductive surface through the entire thickness of the structure in which it is installed. The attachment according to the invention is intended, in particular, for aeronautical applications.

24 Claims, 3 Drawing Sheets

(51) Int. Cl.
  *B64D 45/02* (2006.01)
  *F16B 33/00* (2006.01)
  *C25D 11/02* (2006.01)
  *F16B 25/00* (2006.01)

(56) References Cited

U.S. PATENT DOCUMENTS

| | | | |
|---|---|---|---|
| 2,998,361 | A | 8/1961 | Kitamura |
| 3,075,896 | A | 1/1963 | Mcgraw et al. |
| 3,400,058 | A | 9/1968 | Chambers et al. |
| 3,407,903 | A | 10/1968 | Sansabrino |
| 3,820,297 | A | 6/1974 | Hurd |
| 3,831,213 | A | 8/1974 | Bedi |
| 3,979,351 | A | 9/1976 | Sekhon |
| 3,983,304 | A | 9/1976 | Sekhon |
| 4,702,655 | A | 10/1987 | Kendall |
| 5,018,920 | A | 5/1991 | Speakman |
| 5,685,680 | A * | 11/1997 | Duffy ............... B05D 3/12 219/99 |
| 5,922,472 | A | 7/1999 | Keener |
| 6,228,241 | B1 | 5/2001 | Alwitt |
| 8,920,086 | B2 * | 12/2014 | Stecher ............... F16B 2/04 411/57.1 |
| 9,447,809 | B2 * | 9/2016 | Regnard ............ F16B 25/0021 |
| 2002/0051695 | A1 | 5/2002 | Friederich et al. |
| 2003/0086772 | A1 | 5/2003 | Giannakakos |
| 2004/0131943 | A1 | 7/2004 | Brown |
| 2004/0163740 | A1 | 8/2004 | Keener |
| 2004/0247835 | A1 | 12/2004 | Keener |
| 2005/0181330 | A1 | 8/2005 | Kim |
| 2007/0212558 | A1 * | 9/2007 | Gao ............... C25D 5/022 428/469 |
| 2009/0152120 | A1 * | 6/2009 | Cao ............... C25D 11/02 205/173 |
| 2009/0285654 | A1 | 11/2009 | Stecher |
| 2010/0001137 | A1 | 1/2010 | Keener |
| 2010/0124472 | A1 | 5/2010 | Nguyen |
| 2010/0272537 | A1 | 10/2010 | Haylock |
| 2011/0142567 | A1 | 6/2011 | Haylock |
| 2012/0155229 | A1 | 6/2012 | Araki |
| 2015/0147136 | A1 | 5/2015 | Maurel et al. |

FOREIGN PATENT DOCUMENTS

| | | |
|---|---|---|
| DE | 102010040338 A1 | 3/2012 |
| EP | 2406336 B1 | 3/2010 |
| FR | 1240657 A | 9/1960 |
| FR | 2215453 A1 | 8/1974 |
| FR | 2851580 A1 | 8/2004 |
| FR | 2855836 A1 | 12/2004 |
| FR | 3008754 A1 | 1/2015 |
| FR | 3013781 A1 | 5/2015 |
| GB | 2212580 A | 7/1989 |
| JP | 2009030736 A1 | 2/2009 |
| JP | 2009127777 A | 6/2009 |
| WO | WO 2007/122079 A1 | 11/2007 |
| WO | WO 2010/088647 A1 | 8/2010 |
| WO | WO 2011/050040 A1 | 4/2011 |
| WO | WO 2012/118855 A2 | 9/2012 |
| WO | WO 2015/007919 A1 | 1/2015 |
| WO | WO 2015/007957 A1 | 1/2015 |

OTHER PUBLICATIONS

French Patent Office, French Search Report for French Patent Application No. 1361603 dated Jul. 16, 2014.
File History for U.S. Appl. No. 14/547,802, filed Nov. 19, 2014.
French Application Serial No. 135715, filed Jul. 19, 2013, Regnard et al.—Priority Application in French language.
Certified English Translation of French Application Serial No. 135715, filed Jul. 19, 2013, Regnard et al.
French Patent Application Serial No. 136106, Cover Letter (1 page) and Third Party Observations (10 pages) mailed Aug. 14, 2015.
French Patent Office, Aug. 20, 2015 letter regarding Demande in French Patent Application Serial No. 136106, 1 page.
Poll, Andreas, International Search Report for WO/2015/007919, dated Oct. 20, 2014, 6 pages, ISA European Patent Office.
Fritzen, Claas, French Written Opinion for French Patent Application No. 1361603 dated Aug. 21, 2014, 5 pages, French Patent Office.
French Patent Application Serial No. 13610603, Cover Letter (1 page) and attachment of Third Party Observations (10 pages) mailed Aug. 14, 2015 to Applicant Airbus by French Patent Office INPI.
French Application Serial No. 1357157, filed Jul. 19, 2013, Regnard et al.—Priority Application in French language.
Certified English Translation of French Application Serial No. 1357157, filed Jul. 19, 2013, Regnard et al.

* cited by examiner

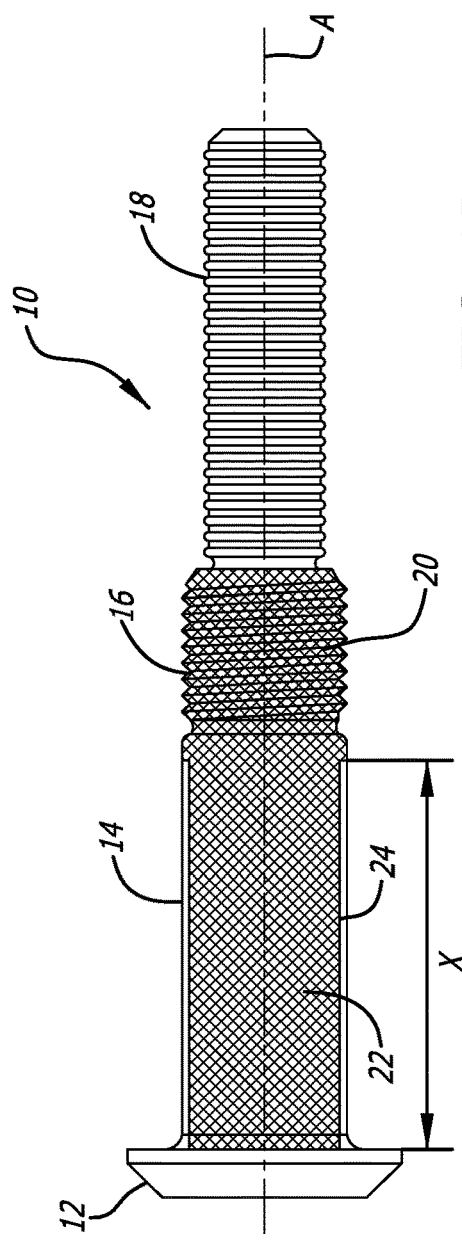
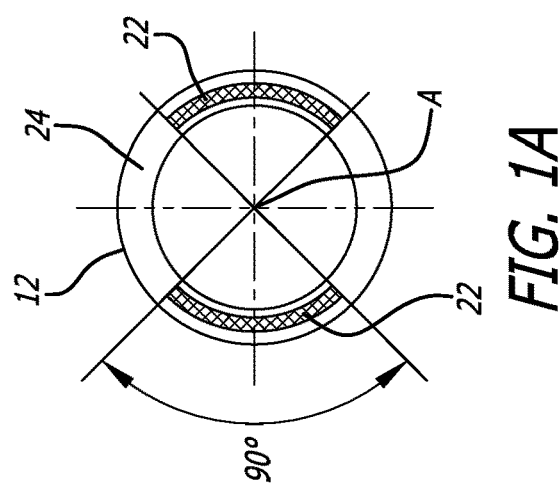
FIG. 1B
FIG. 1A
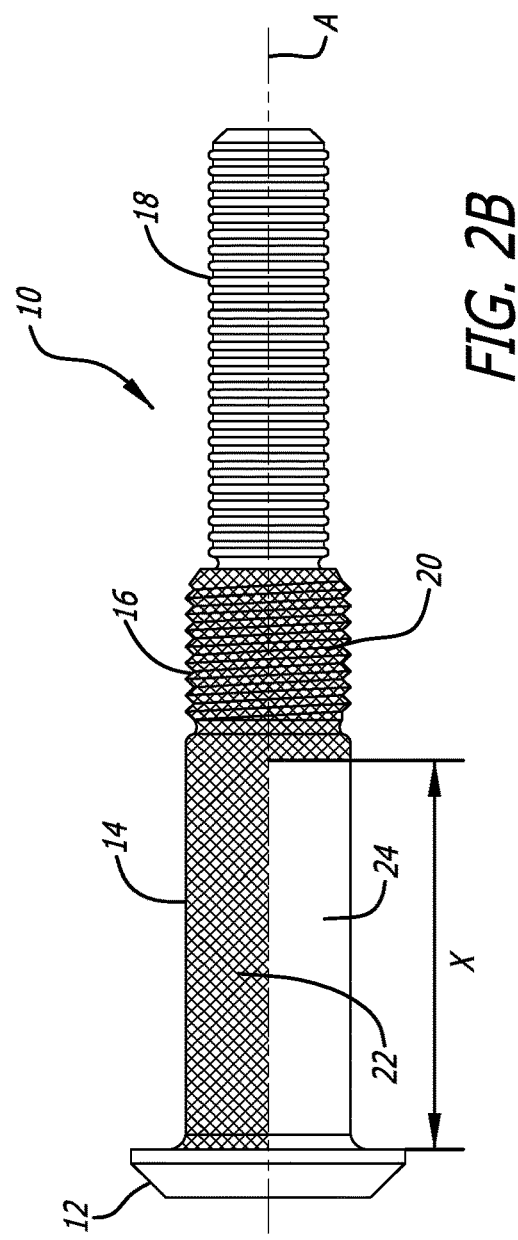
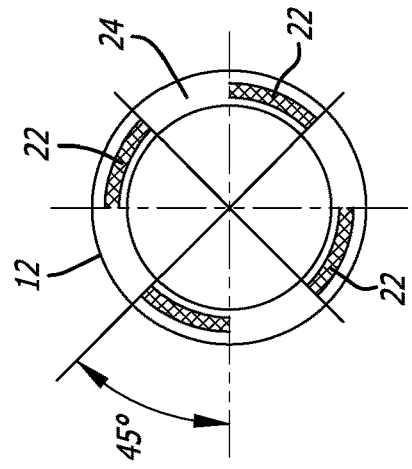
FIG. 2B
FIG. 2A

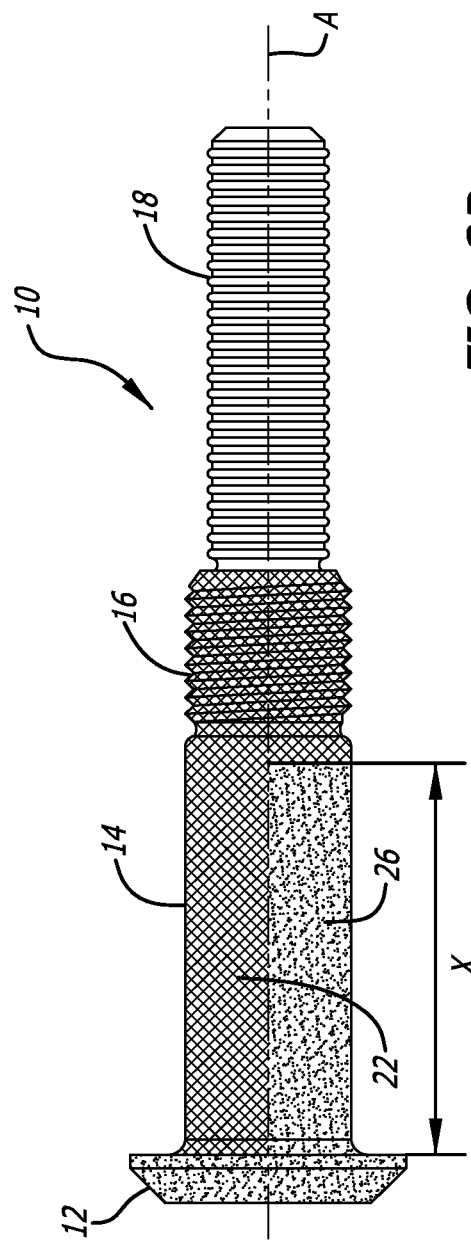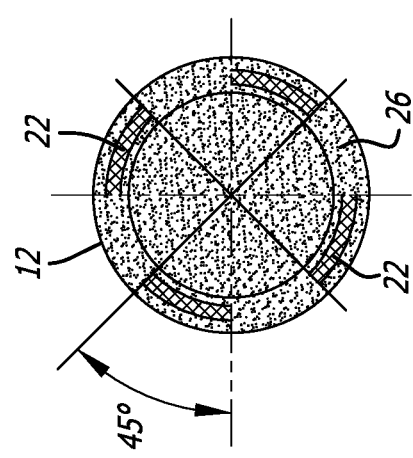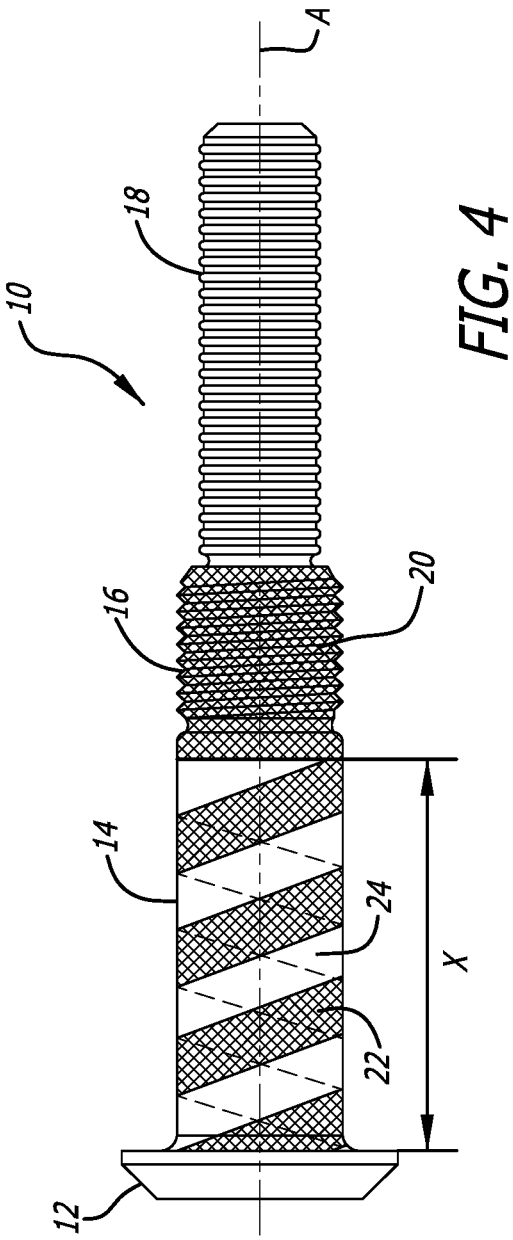

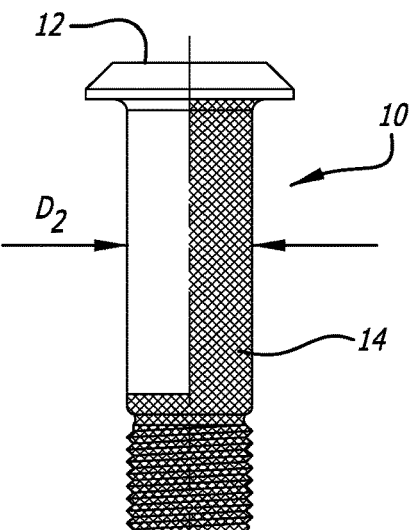
FIG. 5
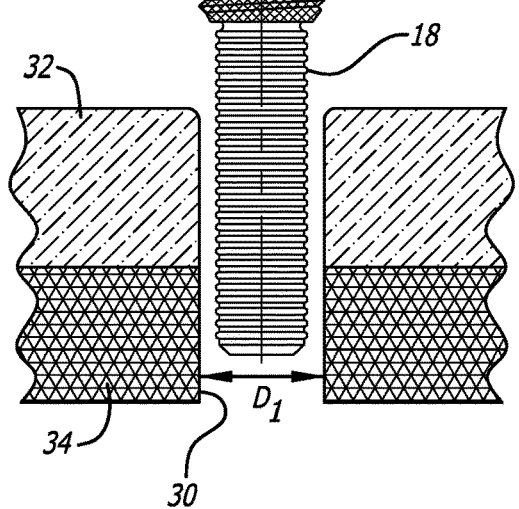
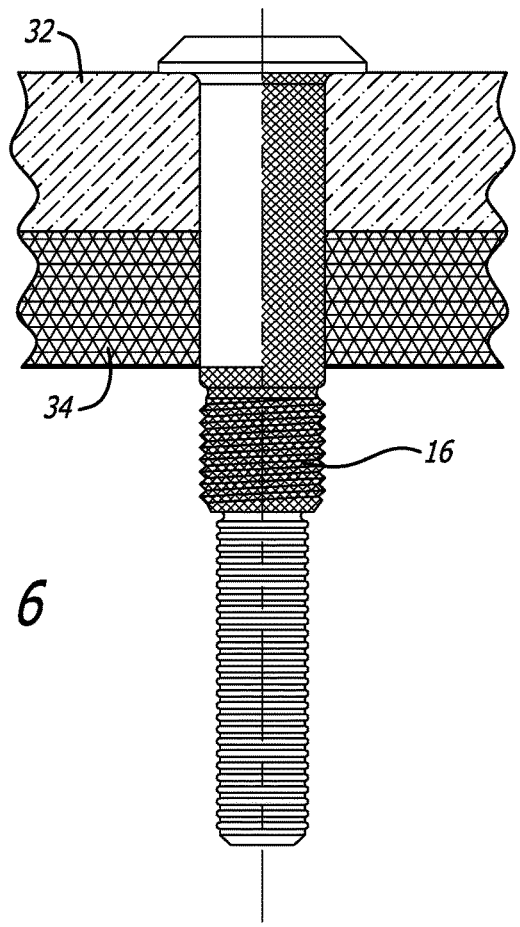
FIG. 6

METAL ATTACHMENT

CROSS REFERENCE TO RELATED APPLICATIONS

The present application is a National Stage of International Application No. PCT/EP2014/065647, filed Jul. 21, 2014, published as WO2015/007919, which claims priority to FR1357157 filed Jul. 19, 2013. The entire contents of the aforementioned applications and publication are incorporated herein by reference.

The present invention relates to a metal fastener with a partial lubricating coating. The technical field of the invention is generally that of fasteners. More specifically, the invention relates to screws, lock groove fasteners, and any other metal fastener intended to assemble structural elements, such as pre-bored elements of an aircraft. Such fasteners are generally made from a metal material like stainless steel or a titanium alloy.

The new generation of airplanes uses a composite materials structure with the benefit of significantly lessening the mass of the airplane and not being sensitive to the phenomenon of fatigue. However, unlike a metal structure, composite materials have the drawback of poorly conducting electricity, and pose problems of lighting strike resistance. In order to resist lightning, it is necessary to close up all spaces that may exist between the fastener and the bore in order to prevent the electrical breakdown of the air that would be entrapped and to allow a good contact between the fastener and the structure.

In the prior art, document WO 2011/050040 teaches sleeve fasteners installed with an interference fit in composite materials. An interference fit is defined by installing a fastener whose outer diameter is greater than the bore diameter that will receive it, which causes the bore to expand when installing the fastener. The fastener comprises a rod comprising a lubricating coating on the threaded portion and on the transitional portion between the straight shank and the threaded part, to facilitate the insertion of the rod into the sleeve.

The drawback of this fastening system is that it includes very little lubricating coating on the shank, which may require very great force to install the fastener.

In addition, the thicker the structures to assemble are, the greater the force required to insert an interference fastener. That force may exceed the maximum force for installing the fastener above which the fastener breaks, whether in the threads, or in a traction groove, or in the installation tool.

It is also known that document GB 2 212 580 teaches an unsleeved metal fastener installed in a composite material structure. This fastener comprises a dielectric lubricating coating—of the TEFLON™ or $MoS_2$ type—on a portion of its shank, allowing the fastener to be inserted into the bore. The portion of the shank connected to the head, supported by an outer surface of the aircraft's structure, which may be struck by lightning, is left bare in order to allow electrical currents to pass from the fastener's head into the structure of the aircraft via the bare metal shank portion, which is conductive. The drawback of this fastener is that it has a single conductive portion placed arbitrarily close to the head, which requires that the adjacent structure be relatively conductive, or comprise a conductive metal mesh.

One objective of the present application is to address the problems of fasteners of the aforementioned prior art. One objective of the invention is to obtain a fastener able to conduct electricity into all layers of a structure comprising at least one low-conductivity layer when the element is struck by lightning, without requiring too much installation force.

The subject matter of the invention is therefore a metal fastener comprising an enlarged head and a smooth shank extending along an axis of revolution, the shank comprising at least one conductive portion and one lubricating portion disposed continuously along the axis of revolution of the fastener.

The inventive fastener comprises alternation of electrically conductive strips and lubricating strips makes it possible to ensure an electrical contact surface on all the structural elements to be assembled—whether they are good or poor conductors—regardless of the composition of the structure, based on the dimensions of the conductive strips. The fastener may therefore be installed in any structure, without requiring a conductive coating in a specific location.

The fastener according to the invention may be installed in structures fully composed of composite materials, or in mixed structures, meaning those that use both composite and metallic materials like aluminium alloys or titanium alloys, for example. In both of these cases, the insertion of the fastener according to the invention may be an interference fit in a metal sleeve previously disposed in a bore of the structures, in order to avoid all risk of delaminating the composite when installing the fastener, and to fill in all air pockets that may exist between the structure and the fastener.

The inventive fastener may also be installed in interference in solely metallic structures, such as those made of aluminium or titanium.

The inventive fastener may comprise one or more of the following characteristics:
  at least one lubricating portion is a lubricant coating applied on at least a portion of the smooth shank,
  the conductive and lubricating portions are disposed parallel to the fastener's axis of revolution,
  at least two lubricating strips are disposed in diametrically opposite fashion relative to the fastener's axis of revolution,
    the conductive and lubricating portions are in helical fashion around the fastener's axis of revolution,
    the conductive portion is a bare metal portion, or a bare metal portion covered with an electrically conductive layer,
    the lubricating portion is a solid lubricating film or an organic resin coating comprising aluminium pigments,
    the shank of the fastener is cylindrical or conical,
    the fastener further comprises a metal sleeve of which an inner diameter is less than an outer diameter of the fastener's shank,
    the locking portion is a thread or a plurality of lock grooves.

The invention also relates to a structure comprising at least two structure elements assembled by a fastener according to one embodiment of the invention, said fastener being inserted into a bore passing through the structural elements, such as, before the insertion of the fastener, an inner diameter of the bore is less than an outside diameter of the fastener shank.

The invention and its various applications shall be better understood upon reading the following description and reviewing the figures that accompany it. Those figures are presented only as an example, and in no way limit the invention. The figures depict:

FIG. 1A: A schematic depiction of an end view of a first example fastener according to the invention;

FIG. 1B: A schematic depiction of a side view of a first example fastener according to the invention;

FIG. 2A: A schematic depiction of an end view of a second example fastener according to the invention;

FIG. 2B: A schematic depiction of a side view of a second example fastener according to the invention;

FIG. 3A: A schematic depiction of an end view of a third example fastener according to the invention;

FIG. 3B: A schematic depiction of a side view of a third example fastener according to the invention;

FIG. 4: A schematic depiction of a side view of a fourth example fastener according to the invention FIG. 5: a schematic depiction of a side view of a fastener according to a first embodiment of the invention, prior to installation in a structure;

FIG. 6: a schematic depiction of a side view of a fastener according to a first embodiment of the invention, after installation of the fastener into the structure.

FIGS. 1A and 1B schematically depict a first example fastener according to the invention. FIG. 1B depicting metal fastener 10, such as one made of the titanium alloy TiA6V, comprising a protruding enlarged head 12, a cylindrical smooth shank 14, and a locking portion 16 in the form of a thread onto which a nut (not depicted) may be tightened. The fastener additionally comprises a pulling stem 18 that makes it possible to pull on the rod in order to insert it into a pre-bored structure. That stem 18 may be an integral part of the rod 10, or removable by means of a threaded end inserted into a tapped end created inside the threaded portion 16. This pulling stem is optional, and may be omitted.

The smooth shank 14, intended to come in close contact with a structure made of one or more materials, which are metal or made of composite materials, is bare. A smooth shank is to be understood as a shank having neither groove nor projection, so that its entire surface is in intimate contact with the surrounding structure. Preferably, it is oxidized by sulphuric acid anodizing to improve the resistance to galvanic corrosion. The threaded portion 16 is fully coated with a layer of lubricant 20, to prevent the screw from getting stuck while it is being installed. The smooth shank further comprises two portions 22 of lubricating coating, disposed in the form of strips parallel to the axis of revolution A of the fastener. Each lubricating portion 22 extends onto the smooth shank 14 and a portion under the head 12. The two lubricating strips 22 are disposed in diametrically opposite fashion relative to the axis of revolution A, with a 90° angle between each strip as depicted in FIG. 1A. The shank 14 surfaces 24 left between the lubricating strips 22 are conductive, and extend along a length X of the shank 14. In this example, the shank 14 has 50% lubricated contact surface area and 50% electrically conductive surface area. The conductive portions 24 being disposed parallel to the axis of revolution A, conduction is ensured regardless of the composition of the structure into which the fastener is inserted. The lubricating portions 22 make it possible to ensure minimal lubrication of the smooth shank 14 along its entire length, so that the fastener may be installed in interference without requiring too much force and without risk of breaking the fastener.

The lubricant used to cover the thread 16 and the lubricating portions 22 may be a solid lubricating film, of the MoS2 type, or more generally, compliant with the SAE AS5272 standard. The lubricant may also be an organic resin with aluminium pigments, such as the coating HI-KOTE™1 or HI-KOTE™ 1NC sold by Hi-Shear Corp. of Torrance, Calif. This type of coating is, for example, described in patents U.S. Pat. No. 3,983,304 and EP2,406,336. The lubricant may also be of the type described in the NAS4006 standard. The lubricant is deposited along a thickness of 5 to 13 μm, for example by spraying. The rod may be covered with a second lubricating layer, such as cetyl alcohol. This second coat facilitates the insertion of the fastener into the structure, and gradually comes off the installation because it does not adhere very strongly to the surface.

FIGS. 2A and 2B depict the same fastener 10 as the one described with reference to FIGS. 1A and 1B. The only difference resides in the number of lubricating portions 22 applied onto the smooth shank 14. In those figures, the shank 14 is covered with four lubricating portions 22, disposed in diametrically opposed fashion relative to the axis of revolution A, with a 45° angle between each strip as depicted in FIG. 2A. In this example, the total conductive surface area of the conductive strips 24 represents 50% of the contact surface area between the fastener's shank and the structure.

FIGS. 3A and 3A depict the same fastener 10 as the one described with reference to FIGS. 2A and 2B. The difference comes from the fact that the fastener is entirely covered with a first conductive layer 26, and comprises four lubricating portions 22 applied to the first conductive metal layer 26. The conductive layer 26 makes it possible to improve electrical conduction between the fastener 10 and the structure. It may be created in the form of a metal deposit of aluminium, or a conductive organic coating or an anodizing type surface conversion.

FIG. 4 depicts a fourth example embodiment of the invention. The fastener is identical to the one described with reference to FIGS. 1A and 1B. The difference comes from the fact that the lubricating portion 22 is created in the form of a helix winding around the axis of revolution A of the fastener 10. The conductive portion 24 is also helical.

The installation method in interference of a fastener 10 comprising an alternation of electrically conductive strips and insulating strips, in a bore 30 passing through at least two structural elements 32, 34 of an aircraft is described below in connection with FIGS. 5 and 6.

For an installation in interference, the inner diameter D1 of the bore 30 is smaller than the outer diameter D2 of the shank 14 of the fastener 10.

The length of the fastener 10 is chosen according to the thickness of the structural elements 32, 34 to be assembled. The length of the shank 14 must therefore be at least equal to the thickness of the structural elements to be clamped, so that the threaded portion 16 is located outside of the structural elements to be clamped, when the fastener head is contact the structural member 32 and the shank 14 of the fastener 10 is fully inserted into the bore 30. The insertion of the attachment 10 in interference in the structural elements is done for example by pushing on the head 12, or by pulling the pulling stem 18 when the fastener 10 comprises such stem.

Naturally, the invention is not limited to the examples given above, and the fastener may vary in its shapes and/or the materials used. Thus, the number of lubricating portions 22 may vary, and the proportion of surface area covered may also vary depending on the fastener's expected performance. A conductive surface area proportion of 50% of the contact surface area between the fastener's shank and the structure is preferable, but this proportion may vary between 20% and 80% of the contact surface area between the fastener's shank and the structure. Length X may vary, and may cover only part of the smooth shank 14, as the width of the conductive 24 and lubricating 22 portions must be adapted based on the desired proportion of total conductive surface area. The portion under the head might also not be covered with lubricant.

In one variant, the locking portion 16 may be formed of lock grooves, onto which a metal collar is swaged. In such a case, it is not necessary to lubricate that portion. The smooth shank 14 may be conical, and installed in interference either in a conical drilled hole, or any sleeve whose inner surface is conical and whose outer surface is cylindrical, in order for the assembly to be installed in a cylindrical drilled hole, which is easier to create than a conical drilled hole. When the inventive device is used with a sleeve, the sleeve comprises an inner diameter less than an outer diameter of the fastener's shank so that the fastener, once inserted, radially expands the sleeve against the sides of the hole drilled into the structure. This variant is particularly well-suited to structures that comprise at least one layer of composite material.

The fastener's head 12 may be countersunk and fit into an additional countersink created in the structure.

The invention claimed is:

1. A metal fastener comprising an expanded head and a smooth shank extending in an axis of revolution, wherein the shank has a shank surface that comprises at least one conductive portion and at least one lubricating portion, disposed continuously along the axis of revolution of the fastener, wherein the shank at least one conductive portion and at least one lubricating portion are disposed continuously and parallel along the axis of revolution of the fastener, wherein the smooth shank comprises a cylindrical shaft, and the at least one conductive portion is a bare metal portion.

2. A metal fastener according to claim 1, wherein the conductive and lubricating portions are disposed parallel to the axis of revolution of the fastener.

3. A metal fastener according to claim 2, wherein at least two lubricating portions are disposed in diametrically opposite fashion relative to the axis of revolution of the fastener.

4. A metal fastener according to claim 1, wherein the conductive and lubricating portions are disposed helically around the axis of revolution of the fastener.

5. A metal fastener according to claim 1, wherein the bare metal portion is covered with an electrically conductive layer.

6. A metal fastener according to claim 5, wherein the bare metal portion comprises titanium.

7. A metal fastener according to claim 6, wherein the bare metal portion comprises titanium oxidized by sulphuric acid anodizing.

8. A metal fastener according to claim 5, wherein the conductive portion is an electrically conductive layer formed of aluminum.

9. A metal fastener according to claim 5, wherein the conductive portion is an electrically conductive layer formed as a conductive organic coating.

10. A metal fastener according to claim 1, wherein the lubricating portion is a solid lubricating film or an organic resin coating comprising aluminum pigments.

11. A metal fastener according to claim 7, wherein the lubricating portion has a thickness of 5 to 13 microns.

12. A metal fastener of claim 8, wherein the lubricating coating comprises phenolic resin.

13. A metal fastener according to claim 1, further comprising a metal sleeve of which an inner diameter is less than an outer diameter of the fastener's shank.

14. A metal fastener according to claim 1, further comprising a locking portion having a thread or lock grooves.

15. The metal fastener of claim 1 wherein the at least conductive portion is surface-treated by means of anode oxidation.

16. A metal fastener of claim 15, wherein the cylindrical shaft comprises a plurality of conductive portions that are surface-treated by means of anode oxidation, and a plurality of lubricating portions, the conductive and lubricating portions extending over angular sectors that are distributed around the periphery of the cylindrical shaft.

17. A metal fastener of claim 16, wherein the conductive and lubricating portions are distributed in a substantially uniform manner around the periphery of the cylindrical shaft.

18. A metal fastener of claim 17 wherein the cylindrical shaft comprises four conductive portions that are surface-treated by means of anode oxidation, each over four angular sectors of an angle substantially 45°, respectively, and that are separated in pairs by means of the lubricating coating and extends over an angular sector of an angle of substantially 45°.

19. A metal fastener of claim 1, wherein the cylindrical shaft comprises a plurality of conductive portions that are bare metal portions, and a plurality of lubricating portions, the conductive and lubricating portions extending over angular sectors that are distributed around the periphery of the cylindrical shaft.

20. A metal fastener of claim 19, wherein the conductive and lubricating portions are distributed in a substantially uniform manner around the periphery of the cylindrical shaft.

21. A metal fastener of claim 20 wherein the cylindrical shaft comprises four conductive portions that are bare metal portions, each over four angular sectors of an angle substantially 45°, respectively, and that are separated in pairs by means of the lubricating coating and extends over an angular sector of an angle of substantially 45°.

22. An aircraft assembly, comprising a first component, a second component, and a metal fastener of claim 1 with the metal fastener comprising the at least one conductive portion and the at least one lubricating portion extending continuously along the axis of revolution of the fastener.

23. The aircraft assembly of claim 22 wherein the cylindrical shaft comprises a plurality of conductive portions that are bare metal portions and a plurality of lubricating portions, the conductive and lubricating portions extending over angular sectors that are distributed around the periphery of the cylindrical shaft.

24. The aircraft assembly of claim 23, wherein the bare metal portions are oxidized by sulfuric acid anodizing.

* * * * *